United States Patent [19]
Phelps

[11] Patent Number: 4,669,164
[45] Date of Patent: Jun. 2, 1987

[54] METHOD AND APPARATUS FOR THE MANUFACTURE OF VARIABLE DIMENSION FANS

[76] Inventor: William D. Phelps, #1 Diana, Little Rock, Ark. 72205

[21] Appl. No.: 822,863

[22] Filed: Jan. 27, 1986

[51] Int. Cl.⁴ .................. B21K 3/04; B23P 15/02; B23P 19/00
[52] U.S. Cl. .................. 29/156.8 R; 29/558; 29/412; 29/417; 29/700; 415/DIG. 3; 416/197 R; 416/219 A; 416/223 R
[58] Field of Search .................. 29/156.8 R, 557, 558, 29/412, 417, 700; 415/DIG. 3; 416/197 R, 219 A, 223 R

[56] References Cited
U.S. PATENT DOCUMENTS 1,072,233  9/1913  Imle ..................... 416/223
2,063,707  12/1936 Soderberg ............... 29/156.8 R
2,434,935  1/1948  Kroon .................... 416/221
4,531,270  7/1985  Griffith et al. ......... 416/223 R X Primary Examiner—Howard N. Goldberg
Assistant Examiner—Ronald S. Wallace
Attorney, Agent, or Firm—Franklin D. Wolffe; Morris Fidelman

[57] ABSTRACT

Construction of impellers of various dimensions are manufactured from tubular hub stock and sheet-like blade stock by cutting a hub of particular length from said hub stock and blades of corresponding length from said blade stock and attaching said blades to said hub. The bore of the hub may be enlarged according to a specified support shaft diameter, and the overall diameter of the impeller may be altered, preferably by trimming ends of the blades prior to mounting on the hub.

10 Claims, 4 Drawing Figures

METHOD AND APPARATUS FOR THE MANUFACTURE OF VARIABLE DIMENSION FANS

PRIOR ART CROSS-REFERENCES

U.S. Pat. No. 2,434,935—TURBINE APPARATUS—Kroon, issued Jan. 27, 1948.

BACKGROUND AND SUMMARY OF THE INVENTION

The invention is in the field of fan manufacture and is particularly directed to fans composed of basic components capable of being easily altered in at least one dimension, preferably prior to assembly, so as to provide fans of different dimensions from like basic components.

Previously, the manufacture of fans differing in the dimensions of blade radial length and hub and blade axial length required keeping an inventory of different sized blades and hubs. Thus, the space requirements and cost of maintaining such an inventory for meeting the varied requirements of customers involve substantial costs of doing business.

Other substantial costs of doing business stem from the time and labor involved in positioning the blades relative to the hub and welding them thereto, such as when dealing with typically designed aluminum impellers commonly referred to as "blast fans", not to mention the materials and time involved in providing and changing work holding jigs.

It is therefore an object of the present invention to provide fans which are selectable in dimensions and are constructed from the same basic hub stock and blade stock.

Further, it is an object of the invention to provide the method and apparatus for manufacturing fans of variable dimension whereby the parts inventory therefore is substantially reduced, resulting in a corresponding reduction in space requirements and inventory costs.

It is an additional object of the invention to provide a basic piece of hub stock and a basic piece of blade stock from which fans of selected dimensions may be constructed.

It is an additional object of the invention to provide extruded lengths of hub and blade stock from which axial lengths of hub and blades may be trimmed or severed, according to the axial length requirements of each fan, and thereafter easily assembled.

It is a further object of the invention to provide that an impeller, formed by assembly of the blades and a hub, may be variable in diameter by trimming a radial length of the blades, preferably prior to such assembly.

It is an additional object of the invention to provide for the impeller being mountable upon shafts of varying diameters according to the requirements of the customer.

In a preferred embodiment of the invention, extruded lengths of hub and blade stock are provided, with the stock being cut according to the specifications of the customer regarding the axial length of the hub and blades as well as the radial length of the blades. The cross-sections of the blade and hub stocks are such that the blade roots are slidably received in the hubs during assembly thereof so that subsequent staking, glueing, or ultrasonic welding may be used to permanently attach the blades to the hubs. Aluminum and plastic materials are particularly adaptable to this construction.

DETAILED DESCRIPTION OF THE INVENTION

Figure 1:
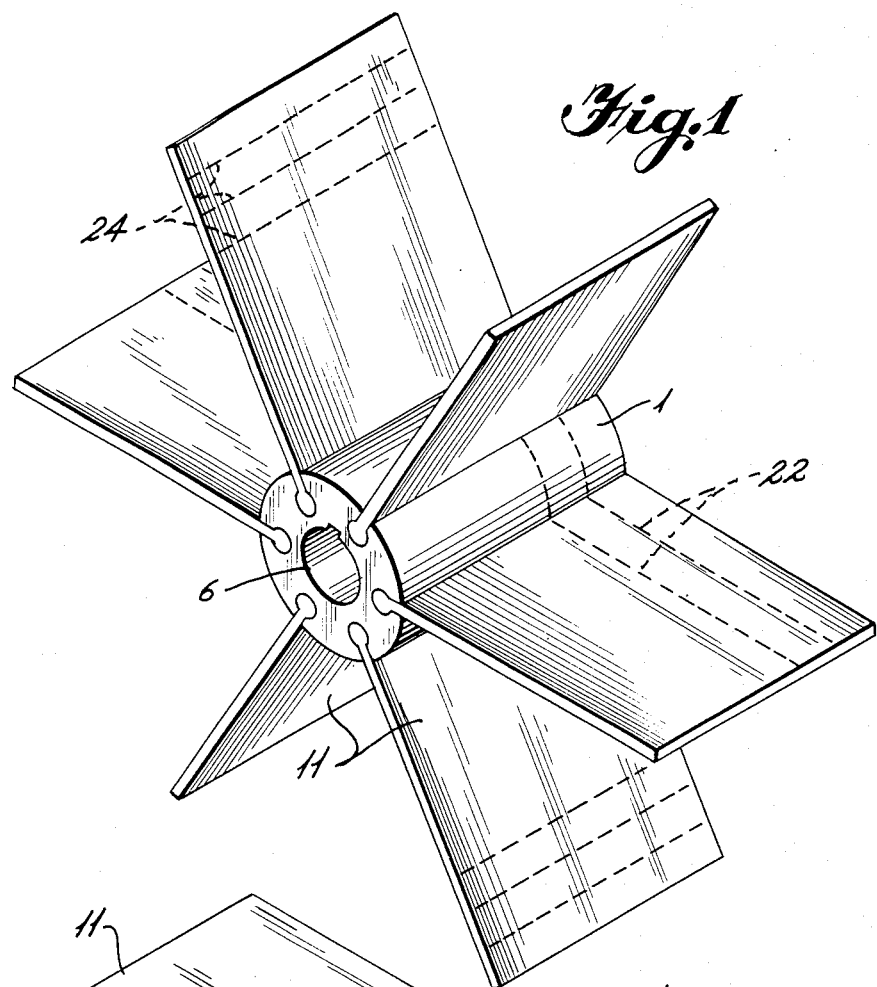
FIG. 1 is an isometric view of an assembled impeller.
Figure 2:
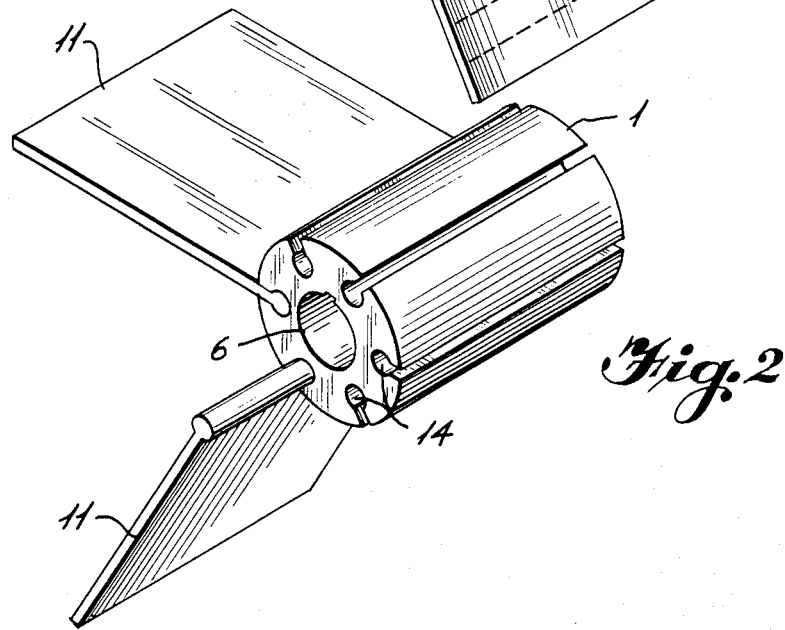
FIG. 2 illustrates assembly of an impeller.
Figure 3:
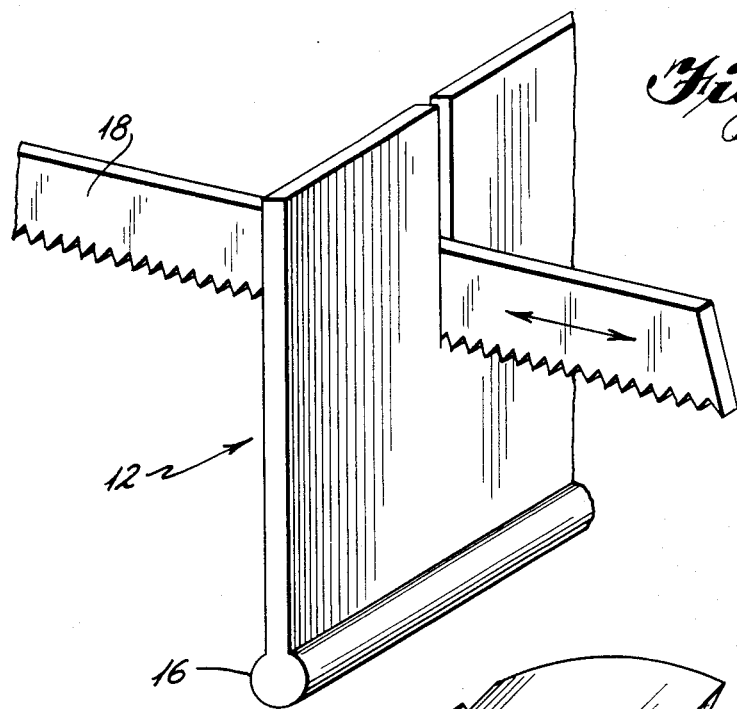
FIGS. 3 and 4 illustrate, respectively, the blade and hub stock from which impellers of various dimensions are constructed.

Referring to the figures, an assembled impeller comprises blades 11 trimmed from blade stock 12 by a saw 18, as illustrated in FIG. 3. Blades 11 are provided with roots 16 slidably receivable in correspondingly shaped channels 14 of hub 1.

Figure 4:
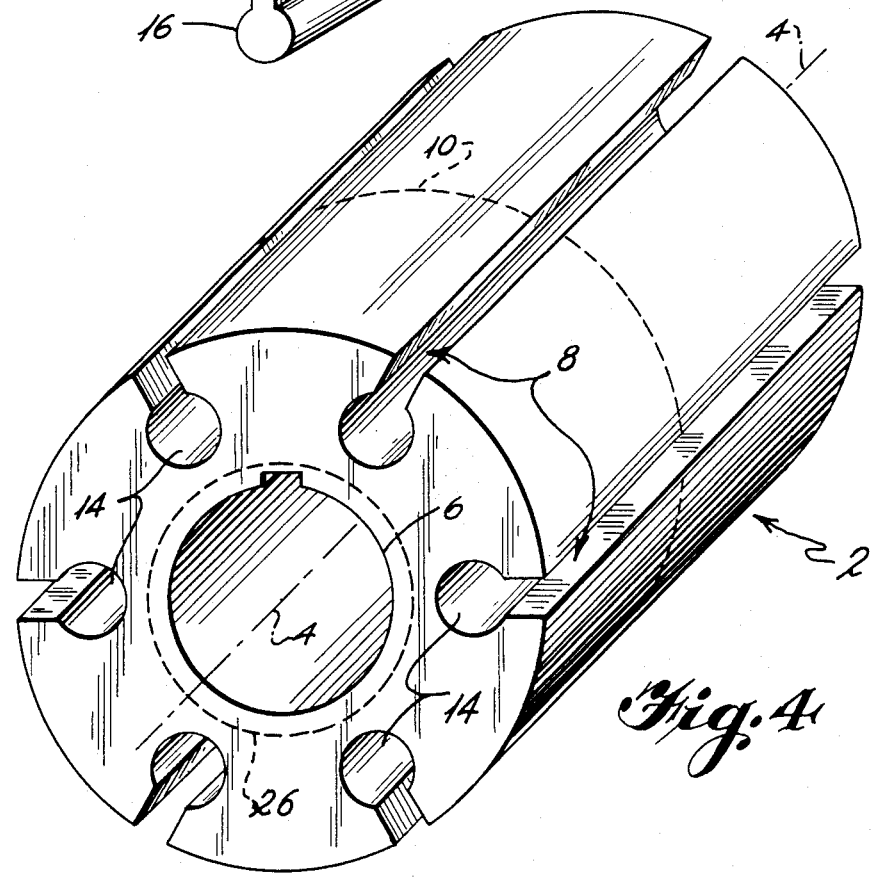

As seen in FIG. 4, hub 1 is trimmable from a length of hub stock 2, as indicated in phantom line at 10, with the axial mounting hole 6 thereof expandable by boring or the like to a different diameter as indicated at 26.

As seen at 24, the blades 11 are trimmable in a radial length according to the impeller diameter requirements of the customer.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

For instance, it is also contemplated that, in particular situations, the fan hub and blades may be extrudable as a stock unit which is trimmable according to the axial length requirements of the customer. However, when considering the various diameter requirements of customers, it is preferred to extrude or otherwise form the blades and hub stock separate from each other. In practice, a table saw has been found practical for trimming the blades in both the axial and radial lengths as well as trimming the hubs according to axial length requirements.

What is claimed is:
1. A method of making impellers, and comprising the steps of:
    providing a hub and blades mountable on said hub, said blades each having a mounting end and a free end;
    mounting said blades on said hub; and
    trimming portions from a free end of each blade after said mounting to provide a remaining blade of specified length
    whereby impellers of variable diameter are realizeable from similar basic components.
2. A method of making impellers, and comprising the steps of:
    providing a hub and blades mountable on said hub, said blades each having a mounting end and a free end;
    trimming portions from an end of each blade to provide a remaining blade of specified length;
    mounting said blades on said hub, whereby impellers of variable diameter are realizeable from similar basic components;
    trimming said hub to a preferred length; and
    trimming a dimension of each of said blades to a preferred length corresponding to said hub preferred length, whereby said impellers are variable in a dimension generally along an axis of rotation of each said hub.

3. A method as in claim 2, and further comprising the steps of:
   extruding a rod of hub stock and a strip of blade stock; and
   trimming portions from said stocks to provide said hub and blades.

4. A method of making impellers, and comprising the steps of:
   providing a hub and blades mountable on said hub, said blades each having a mounting end and a free end;
   trimming portions from an end of each blade to provide a remaining blade of specified length;
   mounting said blades on said hub, whereby impellers of variable diameter are realizeable from similar basic components; and
   boring an axial hole of a selected diameter in said hub according to a corresponding diameter of a support shaft for said hub.

5. A method of making impellers of various sizes from two basic components, and comprising the steps of:
   extruding a length of hub stock;
   extruding a length of blade stock;
   trimming a hub of selected length from said hub stock and a plurality of blades of selected length from said blade stock for each impeller, said blade stock having a width corresponding to said hub selected length to provide an impeller selectable in diameter; and
   attaching said blades to said hub.

6. A method as in claim 5, and further comprising the step of:
   trimming said blade width to a selected dimension and said hub to a corresponding selected length in order to provide an impeller selectable in a dimension generally parallel to an axis of rotation of said impeller.

7. A method as in claim 5, and further comprising the step of:
   boring an axial hole of a selected diameter in said hub according to a corresponding diameter of a support shaft for said hub.

8. Apparatus for manufacturing impellers of variable dimensions, and comprising:
   means for trimming from blade stock a plurality of blades of selected length according to a selected diameter for said impeller;
   means for trimming hub stock to provide a hub of preferred length corresponding to a width of said blade stock; and
   means for attaching said blades to said hub.

9. An apparatus as in claim 8, and further comprising:
   means for trimming said blade stock width selectively prior to said attaching, so as to vary said impeller in a dimension which is generally parallel to a rotation axis of said impeller.

10. An apparatus as in claim 8, and further comprising:
    means for selectively varying a diameter of a support shaft receiving hole of said hub stock according to a particular diameter of said shaft.

* * * * *